United States Patent
Zhu

(10) Patent No.: US 6,490,608 B1
(45) Date of Patent: Dec. 3, 2002

(54) FAST PARALLEL MULTIPLIER IMPLEMENTED WITH IMPROVED TREE REDUCTION SCHEMES

(75) Inventor: Jay Zhu, Fremont, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 09/458,542

(22) Filed: Dec. 9, 1999

(51) Int. Cl.$^7$ ................................................. G06F 7/52
(52) U.S. Cl. ....................................................... 708/626
(58) Field of Search ................................ 708/626, 628, 708/629

(56) References Cited

U.S. PATENT DOCUMENTS 5,586,071 A * 12/1996 Flora ........................... 708/626
5,798,956 A *  8/1998 Park ............................ 708/626
5,978,827 A * 11/1999 Ichikawa .................... 708/626

OTHER PUBLICATIONS

Amos R. Omondi, "Computer Arithmetic Systems: Algorithms, Architecture and Implementation", 1994, Prentice Hall International (UK), pp. 126–129, 160–171.

L. Dadda, "Some Schemes for Parallel Multipliers", 1965, Instituto di Elettrotecnica ed Electtronica del Politecnico di Milano, pp. 349–356.

Israel Koren, "Computer Arithmetic Algorithms", 1993, Prentice–Hall, Inc., pp. 86–92, 108–111.

* cited by examiner

*Primary Examiner*—David H. Malzahn
(74) *Attorney, Agent, or Firm*—Wagner Murabito & Hao LLP

(57) ABSTRACT

Parallel multipliers and techniques for reducing Wallace-trees in parallel multipliers to achieve fewer reduction stages. The parallel multipliers of the present invention, in one embodiment, require one fewer stage of reduction than conventional multipliers proposed by Wallace and Dadda. Accordingly, fewer adder components are required. The speed of the parallel multipliers of the present invention is also improved due to the fewer number of reduction stages. In another embodiment, the method of the present invention is applicable to signed multiplication and includes a step of performing trial reduction on an input matrix that has a maximum number of nodes per column K. The trial reduction step is performed with a reduction target of $\delta_{L-2}$ nodes where $\delta_{L-1} < K \leq \delta_L$. If maximum number of nodes per column in the resulting matrix does not exceed $\delta_{L-2}$, then reduction steps are performed to generate a reduction tree having L-1 reduction stages. Otherwise, reduction steps are performed to generate a reduction tree having L stages. Further, in one embodiment of the present invention, the reduction tree T is then reduced such that as many LSBs (least significant bits) of the tree T at the final stage have at most one node and that the bit adjacent to the LSBs has at most three nodes. In furtherance of the present invention, run-time performance of the present invention is improved when extra nodes at lower and upper edge of the input matrix T may be ignored during reduction.

22 Claims, 20 Drawing Sheets

710
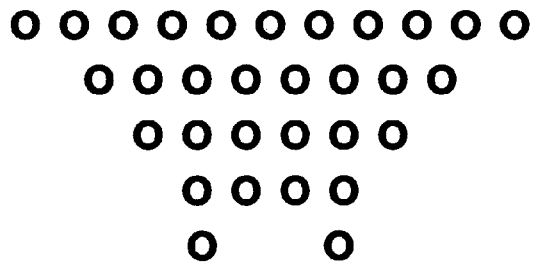
FIG. 7 A

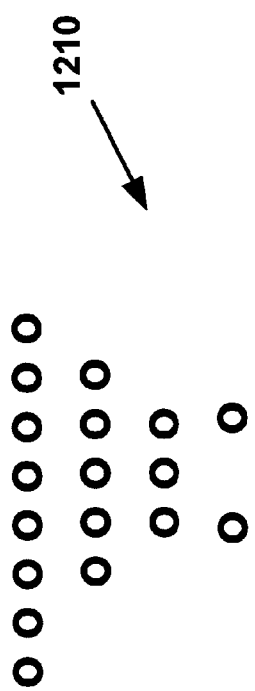

FAST PARALLEL MULTIPLIER IMPLEMENTED WITH IMPROVED TREE REDUCTION SCHEMES

FIELD OF THE INVENTION

The present invention relates generally to the field of hardware used for performing computer arithmetic operations. More specifically, the present invention pertains to circuits capable of performing arithmetic operations on operands of signed and non-signed binary values.

BACKGROUND OF THE INVENTION

Hardware circuits for performing arithmetic operations are indispensable in every computer system, cellular phone and most digital audio/video equipment. In real-time applications (e.g., simulations, speech recognition, video teleconferencing, computer games, streaming audio/video etc.), the overall system performance is heavily dependent on the speed of the multipliers. For instance, processing digital images at 30 frames/second requires nearly 2.2 million multiplication operations per second. These systems require multiplication operations be performed at a very high speed.

A technique that is commonly used in high-speed multiplier is carry-save addition. In carry-save addition, a carry-save adder (CSA) accepts three n-bit operands and generates two n-bit results which include an n-bit partial sum, and an n-bit carry. A second CSA accepts these two n-bit results and another n-bit input operand, and generates a new partial sum and carry. A CSA is therefore, capable of reducing the number of operands to be added from 3 to 2 without any carry propagation. When the number of operands is eventually reduced to 2, the operands can be added together with a carry propagate adder (CPA). Carry save addition has the advantage of minimizing delay caused by carry propagation.

FIG. 1 illustrates a parallel 5-bit-by-5-bit multiplier 100, which is comprised of CSAs 110, 120 and 130 and CPA 140. CSAs are made up of full adders (FA) and half adders (HA). As shown in FIG. 1, each multiplicand multiple is denoted by $MP^i_j$ which is obtained as the logical-AND of bit i of the multiplier and bit j of the multiplicand. The first-level CSA 110 is used for the first three multiplicand multiples, and at the next level, CSA 120 receives the outputs of the first level CSA 110 and adds to them the fourth multiplicand multiples. The outputs of the second level CSA 120 are provided to the third level CSA 130 adds the fifth multiplicand multiples. The outputs of the third level CSA 130 are two numbers which are then summed together by CPA 140 to generate the final product. This type of parallel multiplier is also commonly referred to as parallel-array multipliers:

Another class of parallel multiplier, proposed by C.S. Wallace in 1963, and commonly referred to as Wallace tree multipliers or simultaneous multipliers, are also commonly used. A block diagram of an exemplary six-operand Wallace tree multiplier 200 is illustrated in FIG. 2. As shown in FIG. 2, Wallace tree multiplier 200 includes CSAs 210, 220, 230 and 240 and CPA 250. The first level CSAs 210 and 220 receive the six operands and reduce them two four outputs. The second level CSA 230 receives the shifted carry output and sum output of the CSA 220 and the sum output of CSA 210 and generates two outputs, which are added to the shifted carry output of CSA 210 to generate two numbers. The two numbers which are added together by CPA 250 to generate the final product. In general, a Wallace tree multiplier has fewer levels (or stages) of carry-save adders than a straight forward parallel-array multiplier of the same width, and thus, better performance. A discussion of the parallel array multipliers and Wallace tree multipliers can be found in A. R. Omondi, "Computer Arithmetic Systems: Algorithms, Architecture and Implementation," pp. 160–170, 1994.

A modification of the Wallace tree multiplier, proposed by L. Dadda in 1965 and generally called a Dadda multiplier, has less logic. There also exist a number of parallel multipliers in which other counters are used to reduce the depth of the tree. This, however, does not necessarily result in proportionate improvement in performance because the increase in the complexity of the counters also means an increase delay through them.

As the power of computer systems, cellular phones, digital A/V equipment etc. continues to increase, the demand for faster multipliers is likely to rise. At the same time, systems are also becoming increasingly integrated. Designing fast multipliers that occupy smaller areas on the integrated circuit (IC) chip is critical to a commercially successful product. Therefore, what is needed is a multiplier circuit that is faster and smaller. What is further needed is a method of reducing reduction trees such that the resulting parallel multiplier circuit uses fewer levels of CSA components than conventional multipliers.

SUMMARY OF THE DISCLOSURE

Accordingly, the present invention provides parallel multipliers that require one fewer stage of reduction than conventional multipliers. Accordingly, fewer adder components are required. The speed of the parallel multipliers of the present invention is also improved due to the fewer number of reduction stages.

The present invention also provides a method of constructing reduction trees in parallel multipliers to achieve fewer reduction stages. In one embodiment, the method of the present invention is applicable to signed multiplication and includes a step of generating an input matrix based on the operand sizes, data types, etc., of the multiplier; and determining a maximum number of nodes per column (K) of the input matrix. The method of the present embodiment also includes the step of generating a series of maximum stage capacity numbers $\delta_N$ including $\delta_{L-2}, \delta_{L-1}$, and $\delta_L$ where $\delta_{L-1} \leq K \leq \delta_L$. The method of the present embodiment then performs a step of trial reduction on an input matrix. The trial reduction step is performed in an attempt to reduce the maximum number of nodes per column of the input matrix to less than or equal to $\delta_{L-2}$. If the trial reduction step is successful in reducing the input matrix, then reduction steps are performed to generate a reduction tree that has L-1 reduction stages. Otherwise, reduction steps are performed to generate a reduction tree that has L stages.

In comparison to conventional reduction methods, such as those proposed by Wallace and Dadda, the present invention generates reduction trees that may use one fewer level of reduction stages for the same operands. Multipliers having fewer reduction stages would therefore have a smaller delay and may also require a smaller die area.

Further, in one embodiment, the method of the present invention includes a step of "squeezing" as many LSBs (least significant bits) of the output matrix of the reduction tree to at most one node. According to the present invention, the single nodes at the output matrix can be directly provided to the output of the multiplier without going through the final adder. Thus, a smaller final adder would be needed. Benefits of the "squeezing" step include (1) speeding up the circuit and (2) reducing the size of the circuit. In furtherance of one embodiment of the invention, the bit adjacent to the "squeezed" LSBs may have up to three nodes. Significant savings in delay and die area can be achieved because the third node may be provided to a carry input of the final adder.

Embodiments of the present invention include the above and further include a computer-readable medium having contained therein computer-readable codes for causing a computer-implemented logic synthesis system to perform a method of constructing a parallel multiplier. The method of the present embodiment includes the steps of: (a) accessing an input matrix; (b) determining a depth K of the input matrix; (c) calculating maximum stage capacity numbers for the input matrix. In the present embodiment, the maximum stage capacity numbers includes $\{\delta_N\}$ where $\delta_N = [\delta_0, \ldots \delta_{L-2}, \delta_{L-1}, \delta_L]$. In accordance with the present embodiment, $\delta_{L-1}$ denotes a maximum stage capacity at a stage (L-1) and $\delta_L$ denotes a maximum stage capacity at a stage L. Further, in the present embodiment, $\delta_{L-1} < K \leq \delta_L$. The method of the present embodiment further includes the steps of: (d) performing a trial reduction using stage (L-2) as target stage; (e) provided that a depth of the trial reduction matrix does not exceed maximum stage capacity of the stage (L-2), generating a reduction tree with (L-1) reduction stages; and (f) generating a netlist of the parallel multiplier based on the reduction tree.

BRIEF DESCRIPTION OF THE DRAWINGS

The accompanying drawings, which are incorporated in and form a part of this specification, illustrate embodiments of the present invention and, together with the description, serve to explain the principles of the invention.

FIG. 7A illustrates an exemplary input matrix generated by an input matrix generation step in accordance with an embodiment of the present invention.

FIG. 12A is a bit representation of an input matrix for an exemplary 5-bit-by-3-bit signed multiplier.

DETAILED DESCRIPTION OF THE PREFERRED EMBODIMENTS

Figure 1:
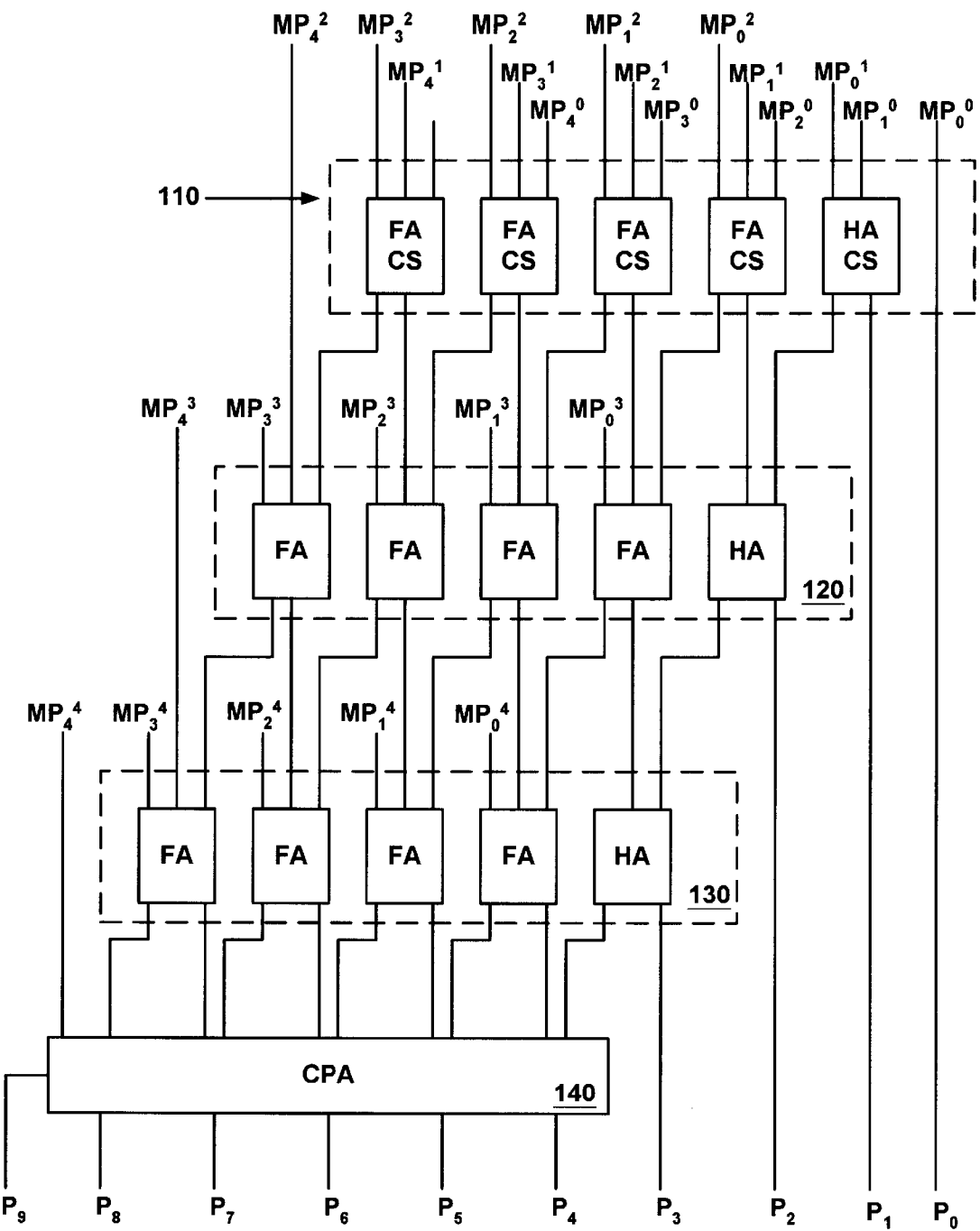
FIG. 1 illustrates a schematic diagram of a conventional 5-bit-by-5-bit parallel array multiplier.
Figure 2:
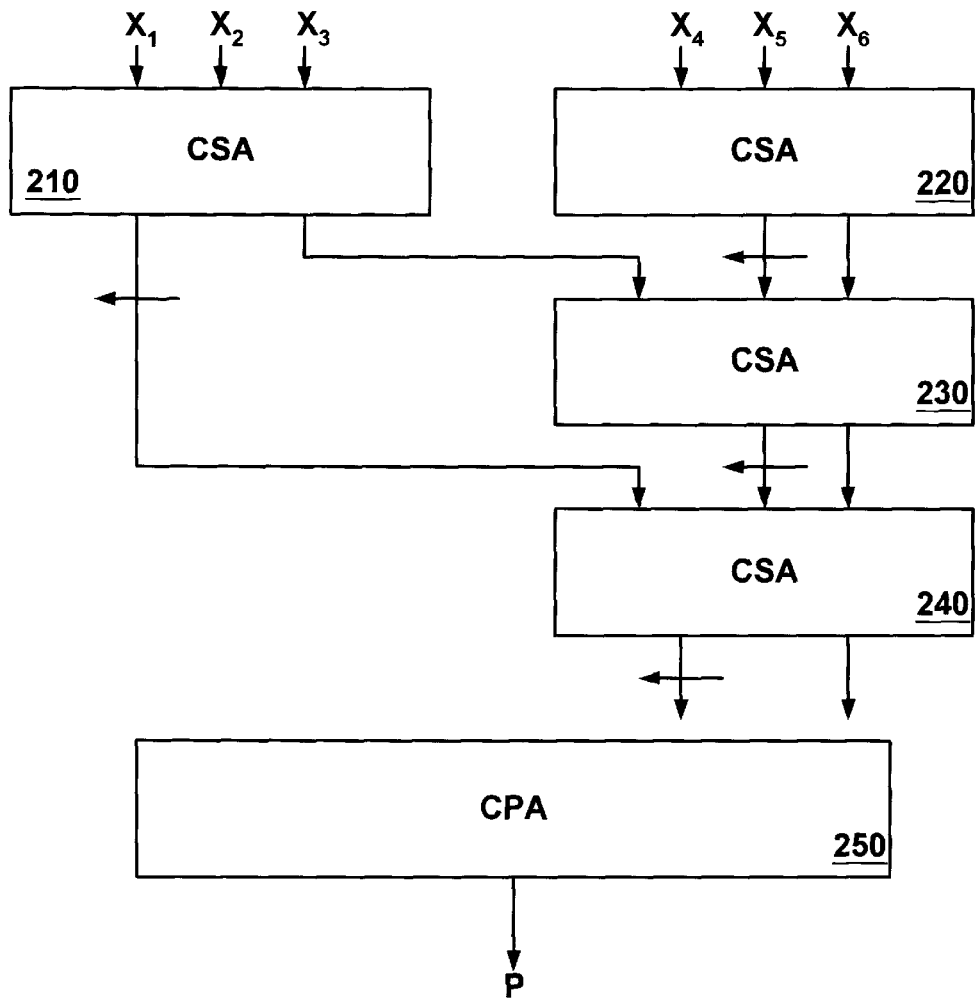
FIG. 2 illustrates a schematic diagram of a conventional Wallace tree multiplier.

In the following detailed description, for purposes of explanation, numerous specific details are set forth in order to provide a thorough understanding of the present invention. However, it will be apparent to one skilled in the art that the present invention may be practiced without these specific details. In other instances, well-known structures and devices are not described in detail in order to avoid obscuring aspects of the present invention.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing", "determining", "generating", "associating", "assigning", or the like, refer to the actions and processes of a computer system, or similar electronic computing device. The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

Aspects of the present invention are discussed in terms of steps executed on a computer controlled EDA (electronic design automation) system. These steps are implemented as program code stored in computer readable memory units of a computer system and are executed by the processor of the computer system. Although a variety of different computer systems can be used with the present invention, an exemplary general purpose computer system 312 is shown in FIG. 3.

In general, computer system 312 includes an address/data bus 300 for communicating information, a central processor 301 coupled with the bus for processing information and instructions, a volatile memory 302 (e.g., random access memory RAM) coupled with the bus 300 for storing information and instructions for the central processor 301 and a non-volatile memory 303 (e.g., read only memory ROM) coupled with the bus 300 for storing static information and instructions for the processor 301. Computer system 312 also includes a data storage device 304 ("disk subsystem") such as a magnetic or optical disk and disk drive coupled with the bus 300 for storing information and instructions and a display device 305 coupled to the bus 300 for displaying information to the computer user. Data storage device 304 can include one or more removable magnetic or optical storage media (e.g., diskettes, tapes) which are computer readable memories. It is appreciated that data produced at the various logic synthesis stages of the present invention, including representations of the different levels of abstraction of the integrated circuit design, such as a netlist, can also be stored in RAM 302, ROM 303 or the storage device 304.

Figure 3:
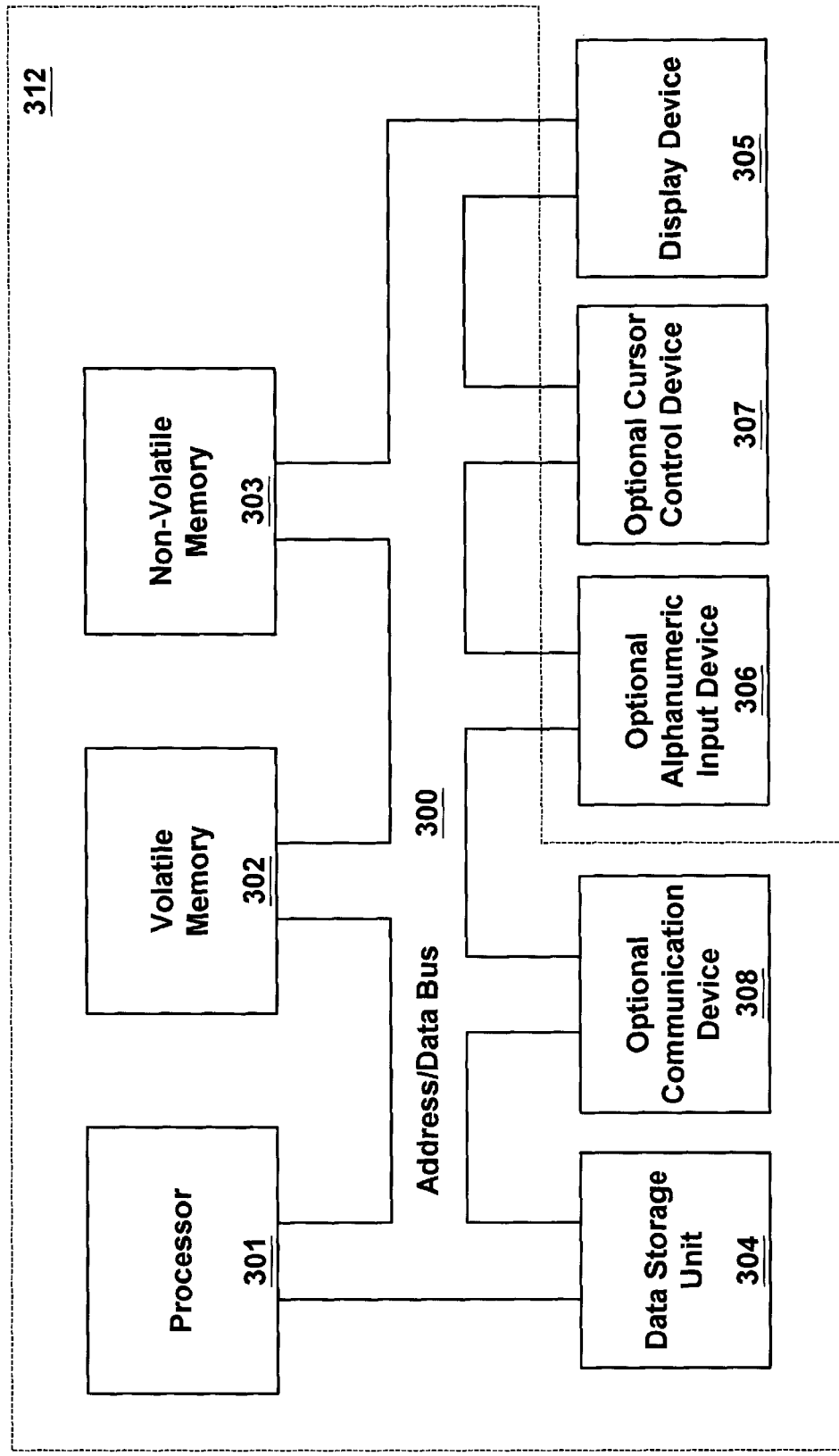
FIG. 3 illustrates a computer system operable as a platform on which methods of the present invention may be implemented.

Also included in computer system 312 of FIG. 3 is an optional alphanumeric input device 306 including alphanumeric and function keys coupled to the bus 300 for communicating information and command selections to the central processor 301. Computer system 312 also includes an optional cursor control or directing device 307 coupled to the bus for communicating user input information and command selections to the central processor 301. Computer system 312 can also include an optional communication device (e.g., network interface card) 308 coupled to the bus 300 for interfacing with other networked computer systems. The display device 305 utilized with the computer system 312 of the present invention may be a liquid crystal device, other flat panel display, cathode ray tube, or other display device suitable for creating graphic images and alphanumeric characters recognizable to the user.

Figure 4A:
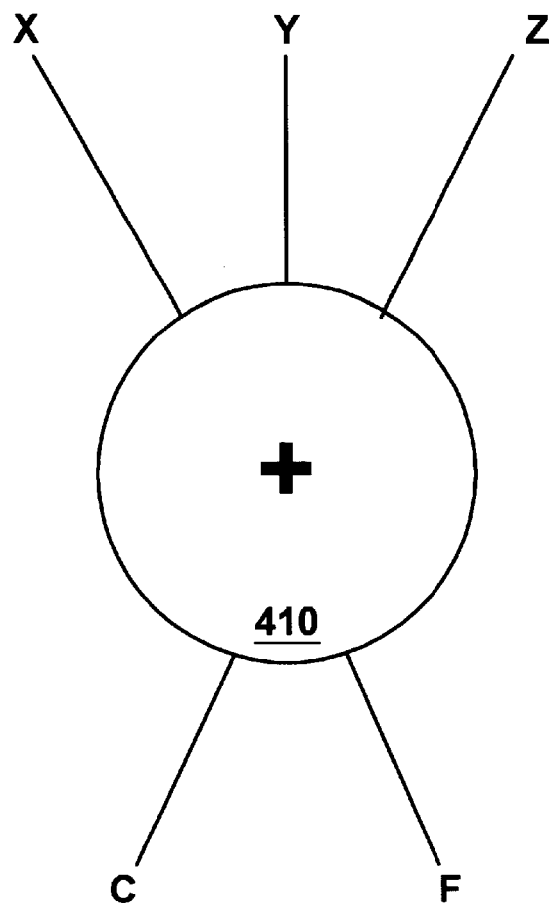
FIG. 4A illustrates a logical block diagram of an exemplary full adder used in constructing reduction trees of the present invention.

Reduction trees according to embodiments of the present invention may be implemented with full adders (FA) and/or half-adders (HA). FIG. 4A illustrates a logical block diagram of an exemplary full adder 410. As illustrated, FA 410 receives three inputs X, Y and Z, and generates thereof two outputs C and F. The FA 410 is also known as a (3, 2) counter. A truth table for the FA 410 is shown below in Table 1.

TABLE 1

| Inputs | C (carry) | F (sum) |
| --- | --- | --- |
| None of X Y Z is 1 | 0 | 0 |
| One of X Y Z is 1 | 0 | 1 |
| Two of X Y Z are 1 | 1 | 0 |
| All X Y Z are 1 | 1 | 1 |

Figure 4B:
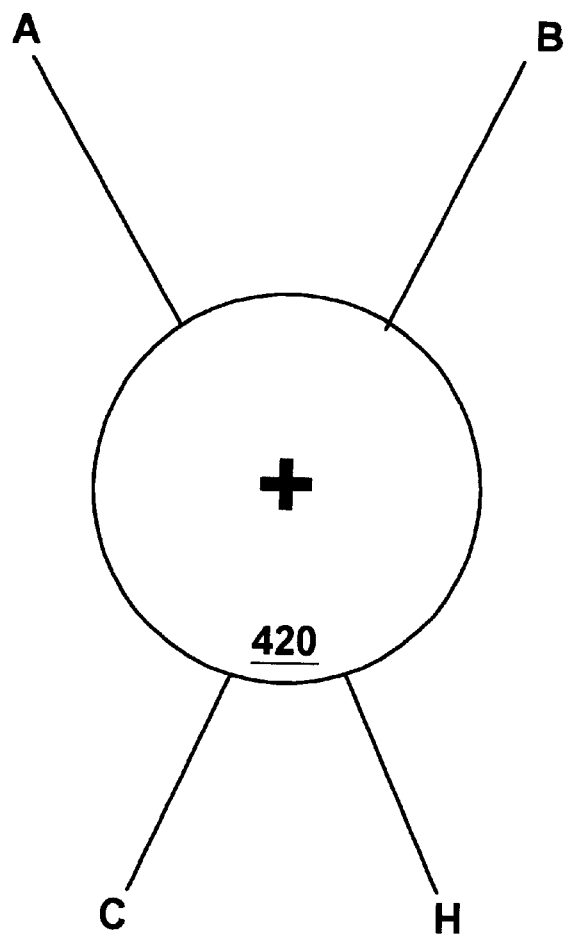
FIG. 4B illustrates a logical block diagram of an exemplary half adder used in constructing reduction trees of the present invention.

FIG. 4B illustrates a logical block diagram of an exemplary half adder 420. HA 420 receives two inputs A and B and generates therefore two outputs C and H. HA 420 is also known as a (2, 2) counter. A truth table for HA 420 is shown below in Table 2.

TABLE 2

| Inputs | C (carry) | H (sum) |
| --- | --- | --- |
| None of A nor B is 1 | 0 | 0 |
| One of A or B is 1 | 0 | 1 |
| Both A and B are 1 | 1 | 0 |

Generally, an accepted economical implementation (in terms of levels of CSAs used) of a Wallace tree is achieved when the number of operands is an element of the series 2, 3, 4, 6, 9, 13, 19, 28, etc. For a given number of operands, for instance W, which is not an element of this series, it has been proposed that the most economical way to implement the Wallace tree is to use only enough CSAs in the top level such that the number of operands in the next level coincide with an element of the abovementioned series. For example, if the number of operands, W, is 27, then according to the conventional tree reduction methods, the most economical implementation is achieved when only enough CSAs are used to reduce the number of operands to 19. Then, the remaining part of the tree will have its operands follow the abovementioned series.

Figure 5:
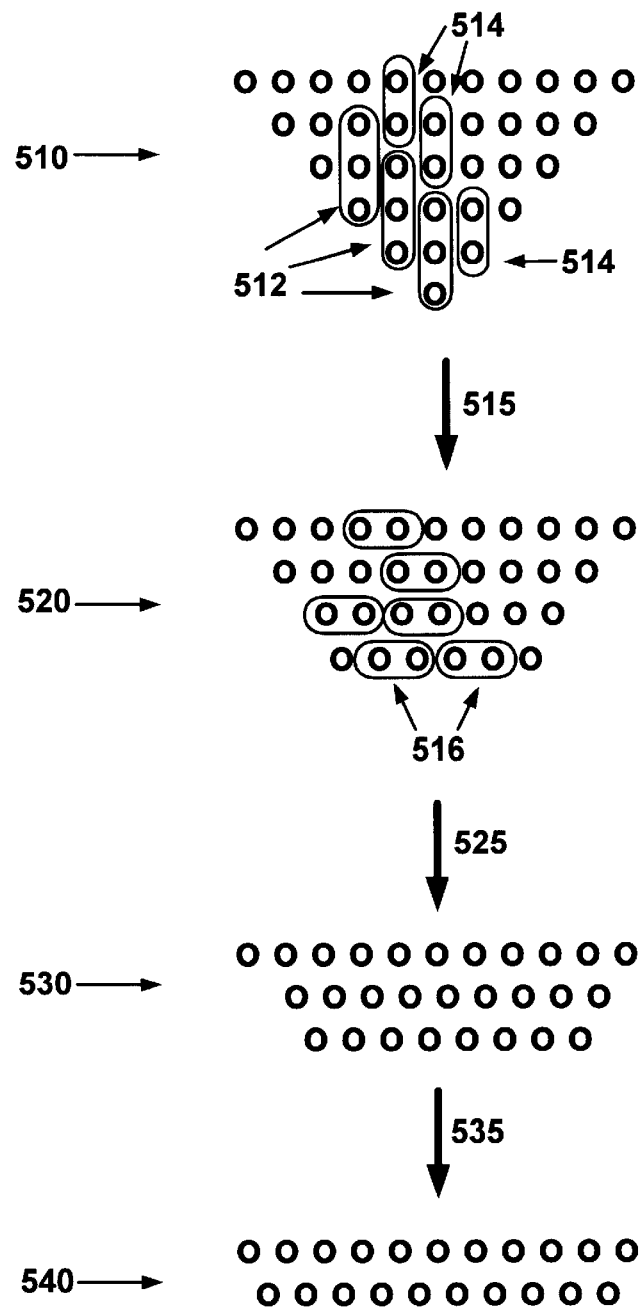
FIG. 5 illustrates a process of constructing an exemplary reduction tree as proposed by L. Dadda.

FIG. 5 illustrates a process 500 of constructing an exemplary reduction tree as proposed in L. Dadda, "Some Schemes for Parallel Multipliers." Alta Frequenza, Vol. 34, pp. 349–356, 1965. Particularly, in FIG. 5, an input matrix 510 for a 5-bit-by-5-bit multiplier is illustrated. Each node of the matrix 510 represents a partial product to be added by the multiplier. The input matrix 510 is then reduced to a second matrix 520 by a first reduction step 515. Vertical blocks 512 of FIG. 5 containing three nodes represents inputs of a full adder (e.g., FA 410) and a vertical block 514 containing two nodes represents inputs of a half adder (e.g., HA 420). The horizontal blocks 516 show the outputs of the full adders and the half adders in the previous level (or, reduction stage). The second matrix 520 is then reduced to a third matrix 530 by a second reduction step 525. The third matrix 530 is then reduced by third reduction step 535 to final matrix 540.

It should be noted that, as illustrated in FIG. 5, the first step of the reduction process 500 is to reduce the maximum number of nodes in each column of the input matrix 510 to 4, which is the closest element of the series 2, 3, 4, 6, 9, 13, 19, etc. The second step of the reduction process 500 reduces the maximum number of nodes in each column of the second matrix 520 to 3. Then, the third step of the reduction process 500 reduces the maximum number of nodes in each column of the third matrix 530 to 2. The reduction scheme proposed by Dadda effectively reduces the number of adder components required by the reduction tree. However, reduction trees generated using Dadda's techniques would have at least as many reduction stages as reduction trees generated using Wallace's techniques. Hence, the performance of Dadda reduction trees is not significantly better than that of Wallace reduction trees.

The present invention provides a tree reduction technique that further decreases in the number of stages (and hence adder components used) in parallel multipliers. According to one embodiment of the present invention, under certain circumstances, a even more economical (in terms of CSA stages) implementation of the reduction tree can be achieved. The present invention is particularly applicable to signed/unsigned multiplication involving one signed number and an unsigned number and signed multiplication involving two signed numbers.

Figure 6:
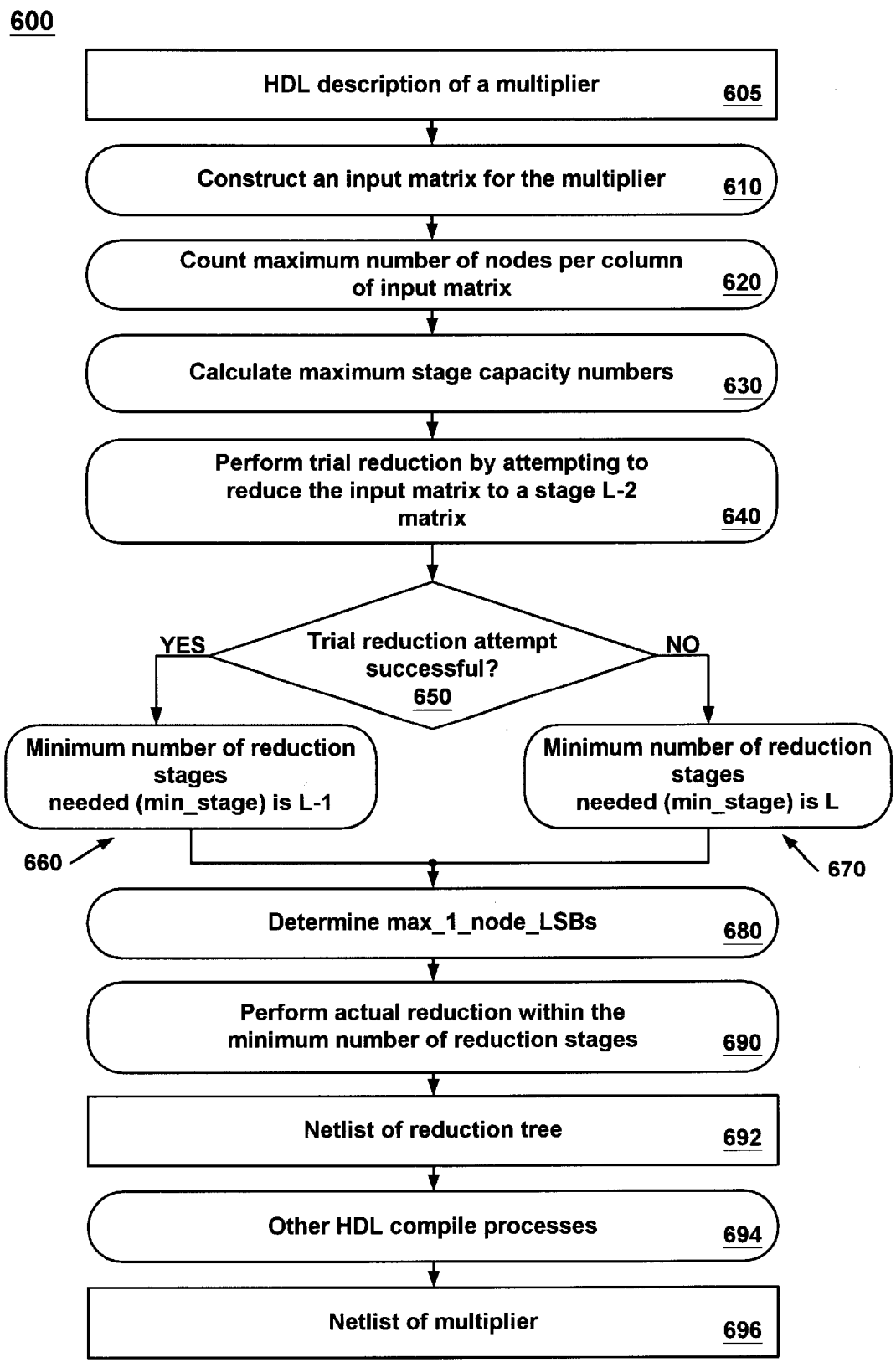
FIG. 6 illustrates steps of a tree reduction process according to an embodiment of the present invention.

FIG. 6 illustrates steps of the tree reduction process 600 according to one embodiment of the present invention. Steps of process 600 may be implemented within an EDA (electronic design automation) system as part of an HDL compile process. Steps of process 600 may also be implemented with computer executable codes or computer readable languages such as C++, VHDL, Verilog, etc., and contained within an HDL description of a muliplier.

As illustrated, the present embodiment receives an HDL description 605 that includes a description of a multiplier. According to one embodiment of the present invention, HDL description 605 describes the size of the operands, the operand types, etc. of the multiplier. In another embodiment of the present invention, HDL description 605 may contain computer readable codes that define steps of the tree reduction process 600 in HDL (e.g., VHDL, Verilog, etc).

Figure 12B:
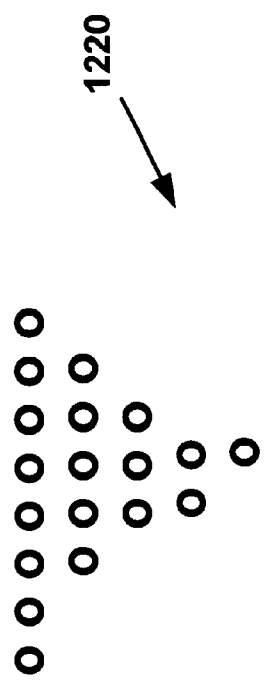
FIG. 12B is a bit representation of an input matrix for an exemplary 4-bit-by-4 bit signed multiplier.
Figure 12C:
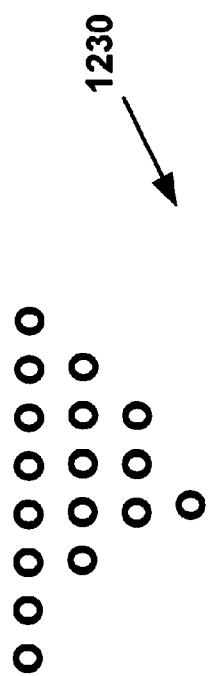
FIG. 12C is a bit representation of an input matrix for an exemplary 5-bit-signed-by-3-bit-unsigned multiplier.
Figure 12D:
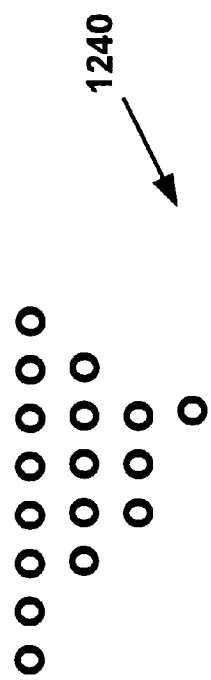
FIG. 12D is a bit representation of an input matrix for an exemplary 5-bit-unsigned-by-3-bit-signed multiplier.

At step 610, the process 600 of the present embodiment constructs an input matrix based on the operands of the multiplier. In the present embodiment, each node of the input matrix represents a partial product to be added by the multiplier. For instance, if a 5-bit-by-5-bit unsigned multiplier is defined in the HDL description 605, then the process 600 will generate an input matrix that is similar to matrix 510. FIG. 7A illustrates, as another example, an input matrix 710 that is generated by step 610 for a 7-bit-by-4-bit signed multiplier if such a multiplier is described in the HDL description 605. An exemplary input matrix 1210 for a 5-bit-by-3-bit signed multiplier is illustrated in FIG. 12A. Another exemplary input matrix 1220 for a 4-bit-by-4 bit signed multiplier is illustrated in FIG. 12B. An exemplary input matrix 1230 for a 5-bit-signed-by-3-bit-unsigned multiplier is illustrated in FIG. 12C. Yet another exemplary input matrix 1240 for a 5-bit-unsigned-by-3-bit-signed multiplier is illustrated in FIG. 12D. Methods for constructing an input matrix are well known in the art, and are therefore not described herein to avoid obscuring aspects of the invention.

At step 620, the process 600 of the present embodiment determines a depth K of the input matrix. The depth K of the input matrix is the maximum number of nodes per bit (or column) of the input matrix. For instance, for input matrix 710, the depth K would be 5 because the maximum number of nodes per column of the matrix 710 is 5.

At step 630, the process 600 of the present invention calculates all the maximum stage capacity numbers δ that are smaller than or equal to K. In the present embodiment, the maximum stage capacity numbers are elements of the series 2, 3, 4, 6, 9, 13, 19, 28, etc. The maximum stage capacity numbers may be calculated by the equation:

$\delta_{i+1} = \text{floor}(\delta_i * 3/2)$, where floor (x) of a number x is the largest integer that is smaller than or equal to x.

An exemplary series of maximum stage capacity numbers and their corresponding stage numbers are illustrated below in Table 3.

TABLE 3

| Stage (L) | Maximum Stage Capacity ($\delta_L$) |
|---|---|
| 0 | 2 |
| 1 | 3 |
| 2 | 4 |
| 3 | 6 |
| 4 | 9 |

TABLE 3-continued

| Stage (L) | Maximum Stage Capacity ($\delta_L$) |
|---|---|
| 5 | 13 |
| 6 | 19 |
| 8 | 42 |
| 9 | 63 |
| 10 | 94 |
| 11 | 141 |
| 12 | 211 |

For example, the depth K for the input matrix 710 is 5. Hence, the process 600 of the present invention calculates all the maximum stage capacity numbers δ that are smaller than or equal to 5. Thus, in the present example, the process 600 generates the series 2, 3, and 4.

At step 640, the process 600 of the present embodiment performs a trial reduction by attempting to "jump" or "skip" a reduction stage by by-passing the stage that has a maximum stage capacity number immediately smaller than K. For example, the process 600 attempts to reduce the input matrix 710 such that the maximum stage capacity of the resulting matrix is 3.

Figure 7B:
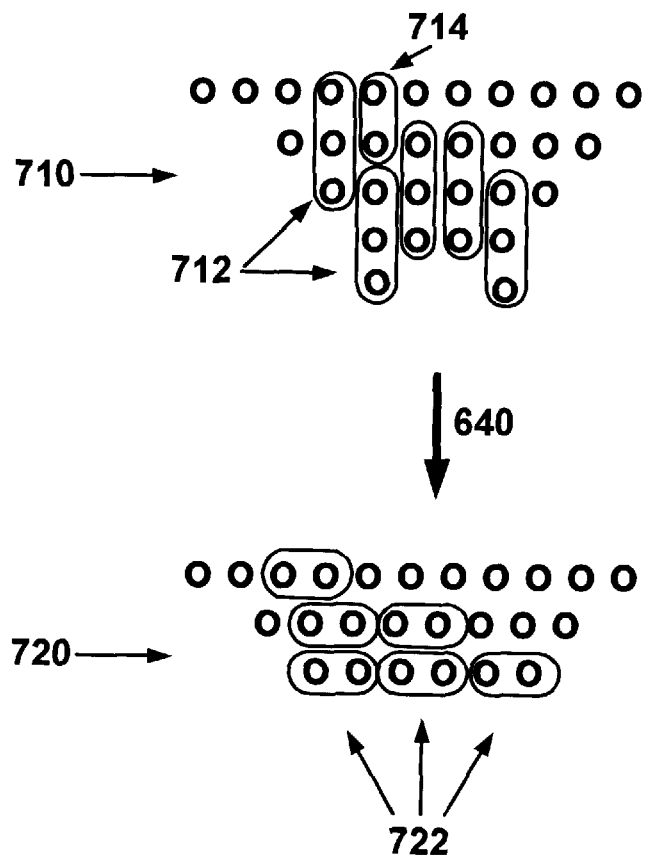
FIG. 7B illustrates an exemplary trial reduction step in accordance with an embodiment of the present invention.

A successful exemplary trial reduction step is illustrated in FIG. 7B. As illustrated, matrix 710 is marked with vertical blocks 712 and 714. Vertical blocks 712 with three inputs represent inputs of full adders (e.g., FA 410) and vertical blocks 714 with two inputs represent inputs of half adders (e.g., HA 420). An exemplary trial reduction matrix 720 is illustrated in FIG. 7B. Trial reduction matrix 720 is marked with horizontal blocks 722 which represent outputs of the full adders and half adders that reduces the matrix 710.

It should be noted that the trial reduction step 640 may fail for certain input matrix configurations. For instance, for matrix 510, it would be impossible to reduce the maximum number of nodes per column to 3 nodes after one reduction stage using only (3,2) counters and (2,2) counters.

At step 650, the process 600 determines whether the trial reduction step 640 is successful by determining whether the resulting matrix has more nodes than the maximum stage capacity of the target stage. If the resulting matrix has fewer than or the same number of nodes per bit as the maximum stage capacity of the target stage, the reduction process 600 of the present embodiment is capable of producing a reduction tree that has one fewer reduction level than conventional reduction trees. It is therefore possible to reduce the input matrix to the output matrix in (L-1) stages. However, if the resulting matrix has more nodes per bit than the maximum stage capacity of the target, the reduction process 600 will not be able to produce a reduction tree that has fewer reduction levels than conventional reduction trees. It is therefore only possible to reduce the input matrix to the final matrix in L stages.

At step 660, if it is determined that the trial reduction step 640 succeeds in "skipping" a stage, the process 600 sets the initial reduction stage to the one that is lower than the stage that has a maximum stage capacity closest to and lower than K. In the present embodiment, the initial reduction stage would be stage (L-2). In the present embodiment, a variable "min_stage" (for indicating the minimum number of reduction stages required) would be set to (L-1).

At step 670, If it is determined that the trial reduction step 640 fails in "skipping" a stage, the process 600 then sets the initial reduction stage to the one that has a maximum stage capacity lower than and closest to K. The initial reduction stage would be stage (L-1). In the present embodiment, the variable "min_stage" would be set to L.

At step 680, the process 600 of the present embodiment determines the maximum number of bits (or columns) that can be "squeezed" to a single node within the minimum number of reduction stages determined by step 650. The delay and area of the multiplier is determined by partial products generation logic, reduction tree logic and CPA logic. Reducing the delay and area of each of these logic circuits thus results in a reduction of delay and area of the multiplier. The area and delay of a CPA are the functions of bit width. An adder with shorter width has shorter delay and smaller area than wider adders. Thus, it is desirable to reduce the width of the CPA. In the present embodiment of the invention, step 680 reduces as many columns in the LSB of the reduction tree down to as most 1 bit such that the CPA has the shortest possible bit width.

Table 4 below illustrates pseudocode according to an implementation of step 680 of the present embodiment.

TABLE 4

/* Find out max_1_node_LSBs, maximum number of columns which
can be reduced to 1 row within min_stage stages of reduction.
Assume that the bit index of bits matrix starts from 0 - LSB
*/
    (1) Set max_1_node_LSBs = 0.
    (2) LOOP for squeeze_bit_idx from 0 to MSB of the matrix
    T
        (2.1) LOOP for reduction stage L from min_stage
        down to 1
            (2.1.1) For bit_x in [0, squeeze_bit_idx],
            assume there are n nodes in column bit_x
                (2.1.1.1) If n>2, then apply (n/3) full
                adders
                (2.1.1.2) If n = 2 AND all columns of
                bits from 0 to bit_x have at most one
                node, then apply one half adder in bit_x
                to reduce the number of nodes down to one
            (2.1.2) For bit_x = squeeze_bit_idx+1, apply
            reduction process with target node number $\delta_L$ +
            1
            (2.1.3) For bit_x > squeeze_bit_idx+1, apply
            reduction process with target node number $\delta_L$
        (2.2) At the final reduction stage, check the
        number of nodes for each bit. If any column has more
        than 2 nodes (exception: bit squeeze_bit_idx+1 can have
        3 nodes), then exit LOOP of (2); Otherwise, set
        max_1_node_LSBs = (squeeze_bit_idx+1), continue LOOP of
    (2)

As illustrated in Table 4, the step 680 determines "max_1_node_LBSs," which is the maximum number of columns reducible to a single node within the predetermined minimum number of reduction stages.

At step 690, the process 600 of the present invention performs an actual tree reduction step using the initial target stage determined at steps 660 or 670. The actual reduction step 690 of the present embodiment also uses the maximum number of "squeezed" columns (max_1_node_LSBs) determined at step 680. The step of performing the actual tree reduction in accordance with an embodiment of the present invention is described below in pseudocode in Table 5.

TABLE 5

/* Actual tree reduction */
    LOOP for reduction stage L from min_stage down to 1
        For bit_x in [0, max_1_node_LSBs-1], assume there
        are n nodes in column bit_x.
            If n>2, then apply (n/3) full adders.
            If n=2 AND all columns of bits from 0 to bit_x
            have at most one node, then apply one half
            adder in bit_x to reduce number of nodes down
            to one.
    EXIT It should be noted that, in the present embodiment of the invention, the step of "squeezing" the columns (e.g., step 680) and the step of actual tree reduction (e.g., step 690) are performed separately. Purposes of separating these steps include (1) minimization of the width of the CPA and (2) minimization of the number of full adders and half adders used in the reduction tree.

Figure 7C:
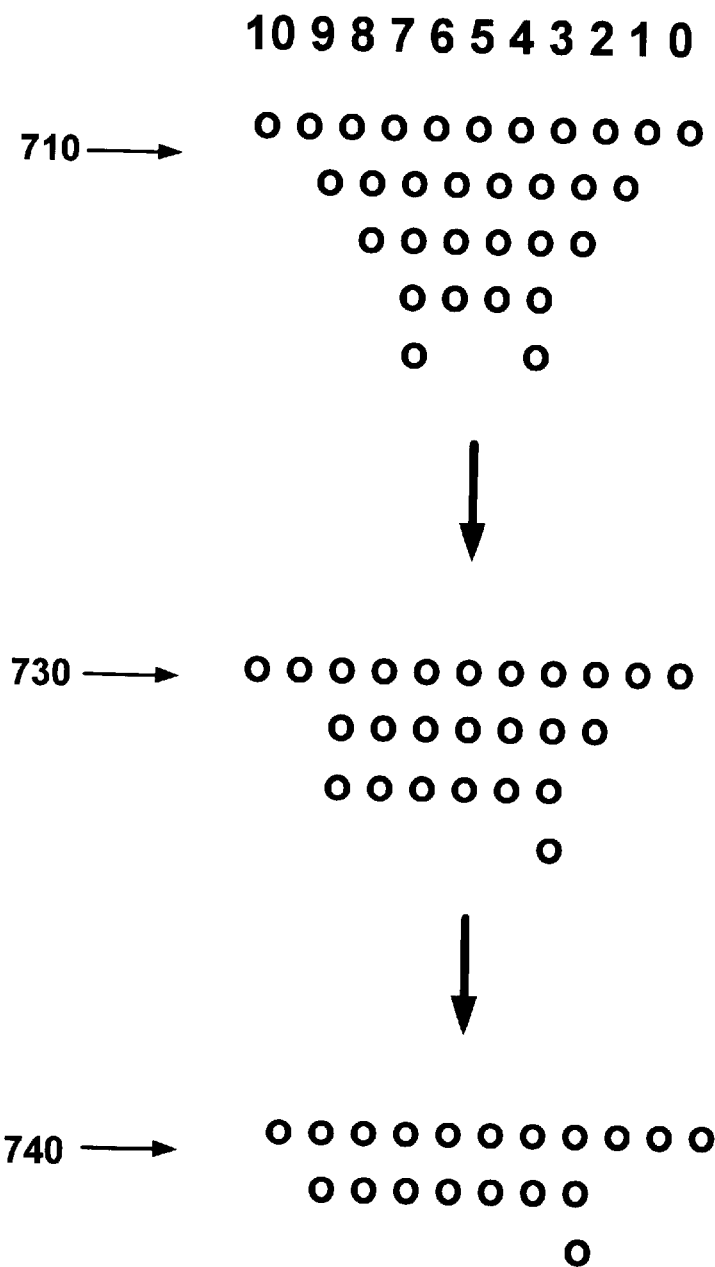
FIG. 7C illustrates an exemplary tree reduction step in accordance with the present embodiment.

FIG. 7C illustrates an exemplary actual tree reduction step (e.g., 690) in accordance with the present embodiment. As illustrated, input matrix 710 with depth K=5 is first reduced to matrix 730. It should be noted that matrix 730 has at most 3 nodes in all columns except column 3, which has 4 nodes. Matrix 730 is then reduced again to matrix 740, which has at most 2 nodes in each column except column 3. It should be noted that, prior to the actual tree reduction step, the maximum number of columns squeezable to 1 bit, three columns (columns 0, 1 and 2) are "squeezed" such that they have at most one node such that the nodes can be provided directly to the output of the multiplier without going through the final adder. The third node 742 is for coupling to a carry-in input of a final adder.

The process 690 of the present embodiment will also generate a netlist 692 for the reduction tree. In the present example, the reduction tree reduces the matrix 710 into the final matrix 730 in two stages.

Thereafter, at step 694, other HDL compilation processes are carried out to generate a netlist 696 of a parallel multiplier.

It should be noted that, in one embodiment of the present invention, steps of the process 600 (e.g, steps 610 to 694) are defined by an HDL synthesizer of the EDA system. In that embodiment, HDL description 605 may only contain a description of the characteristics of the mutliplier (e.g., operand types, number of bits in the operands, etc.), and may not include implementation detail of the multiplier. In other embodiments of the present invention, HDL description 605 may contain computer readable codes for causing an EDA system to perform steps of the process 600 (e.g., steps 610 to 694).

Figure 8:
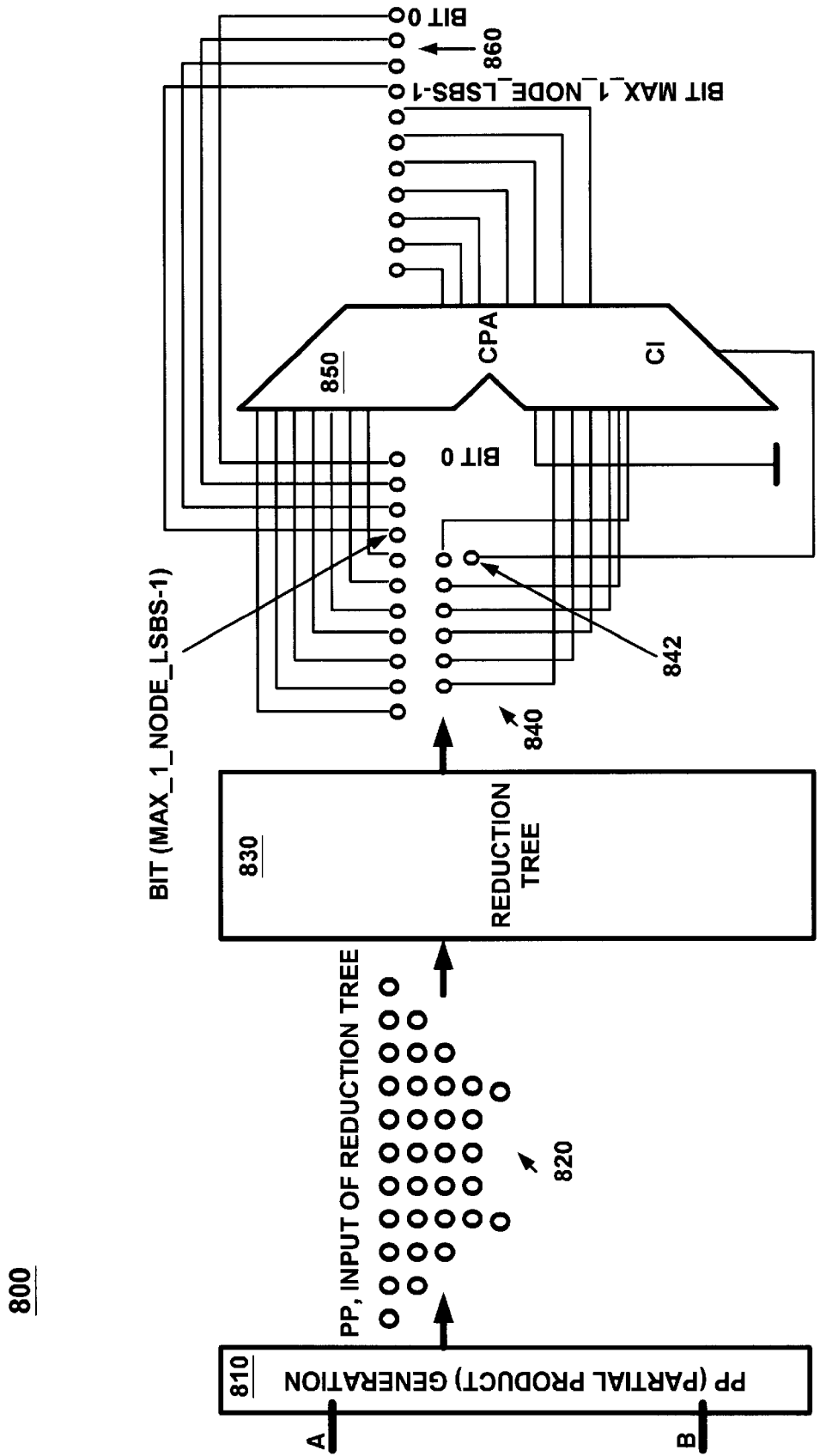
FIG. 8 illustrates a block diagram of an exemplary parallel multiplier according to an embodiment of the present invention.

A block diagram of an exemplary parallel multiplier 800 according to an embodiment of the present invention is illustrated in FIG. 8. As illustrated, multiplier 800 of the present embodiment includes a partial product generation block 810, a reduction tree structure 830 and a carry propagate adder (CPA) 840. As illustrated, partial product generation block 810 receives operands A and B and outputs the partial products of the operands in the form of a matrix 820. Matrix 820 is then provided to reduction tree structure 830. In accordance with the present embodiment, reduction tree structure 830 includes one fewer reduction stages than conventional reduction trees. Particularly, the reduction tree structure 830 may be generated by process 600 and includes only two reduction stages.

With reference still to FIG. 8, the outputs of the reduction tree structure 830 is an output matrix 840. As shown, the output matrix 840 includes 3 rows: the first row includes eleven nodes from bit-0 to bit-10, the second row includes six nodes from bit-4 to bit-9, and the third row includes a single node at bit 4. Bit-0 to bit-3 are directly coupled to the output of the multiplier because these bits do not need to be added by CPA 850. Bit-4 to bit-10 are added by CPA 850 to form the MSBs of the final product. It should also be noted that the single node 842 at bit-4 of the output matrix 840 is provided to the carry-input Ci of the CPA 850. CPA 850 adds the appropriate bits of the output matrix 840 to generate a product at output 860.

Figure 10A:
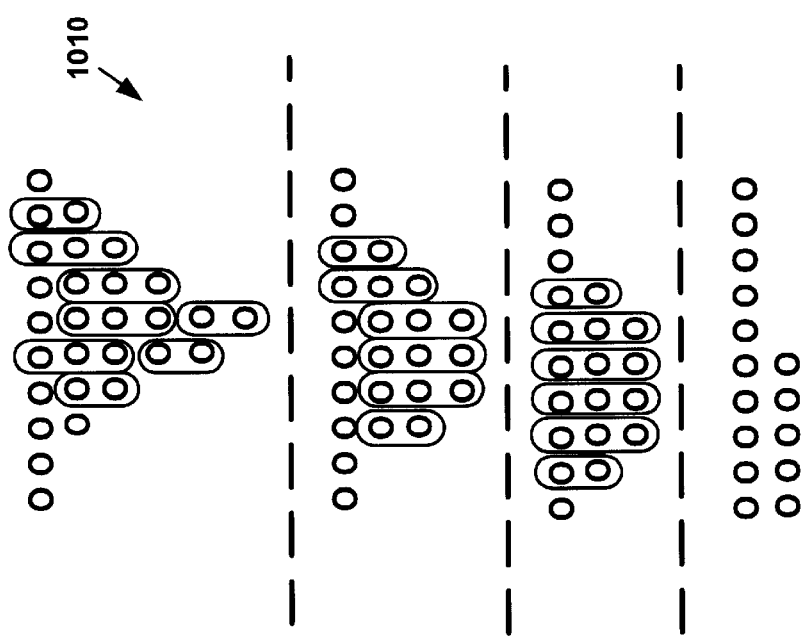
FIG. 10A is a bit representation of a reduction tree for a 5-bit-by-5-bit signed multiplier that does not have a column with three rows in the final stage.
Figure 10B:
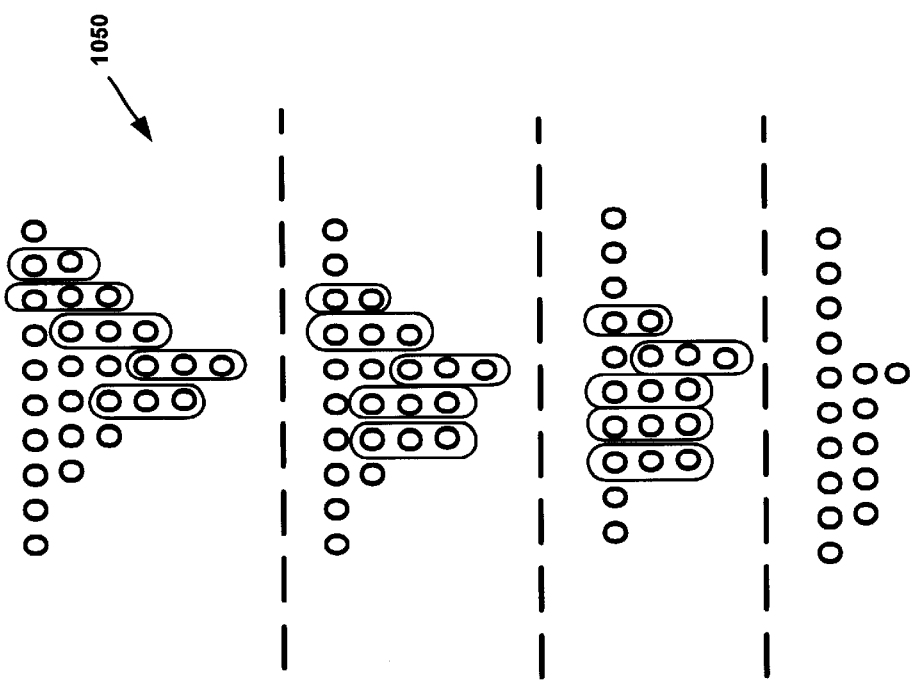
FIG. 10B is a bit representation of a reduction tree for a 5-bit-by-5-bit signed multiplier that has a column with three rows in the final stage and uses fewer adders than the reduction tree of FIG. 10A in furtherance of an embodiment of the present invention.

In accordance with the present embodiment, allowing bit-4 of the output matrix 840 to have three rows has two benefits. First, fewer number of counters are required in the reduction tree. Second, in certain cases, more columns in the output matrix can be "squeezed." FIG. 10A illustrates a reduction tree 1010 for a 5-bit-by-5-bit signed multiplier that does not have a column with three rows in the final stage. As illustrated, a total of twelve full adders and eight half adders are used in the tree 1010. FIG. 10B illustrates a reduction tree 1050 for the 5-bit-by-5-bit signed multiplier that has a column with three rows in the final (output) stage. Tree 1050 is constructed with twelve full adders but only three half adders. In comparison to tree 1010, tree 1050 utilizes five fewer adders.

Figure 11A:
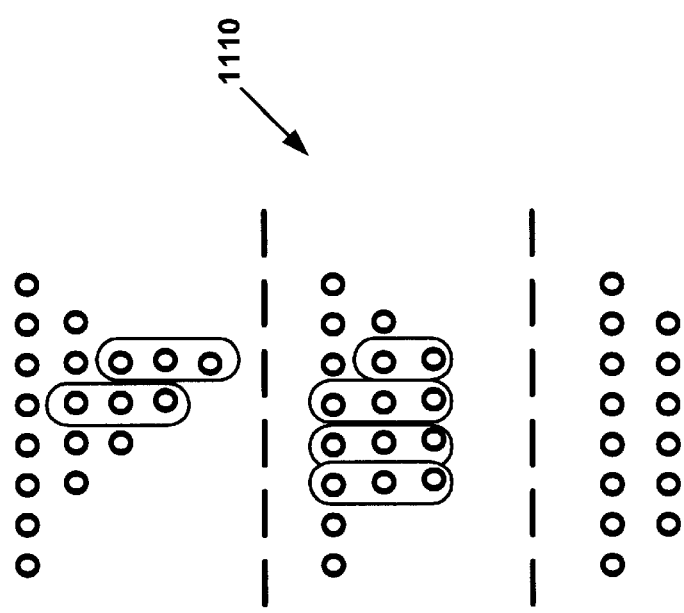
FIG. 11A is a bit representation of a reduction tree for a 4-bit-by-4-bit signed mutliplier that does not have a column with three rows in the final stage.
Figure 11B:
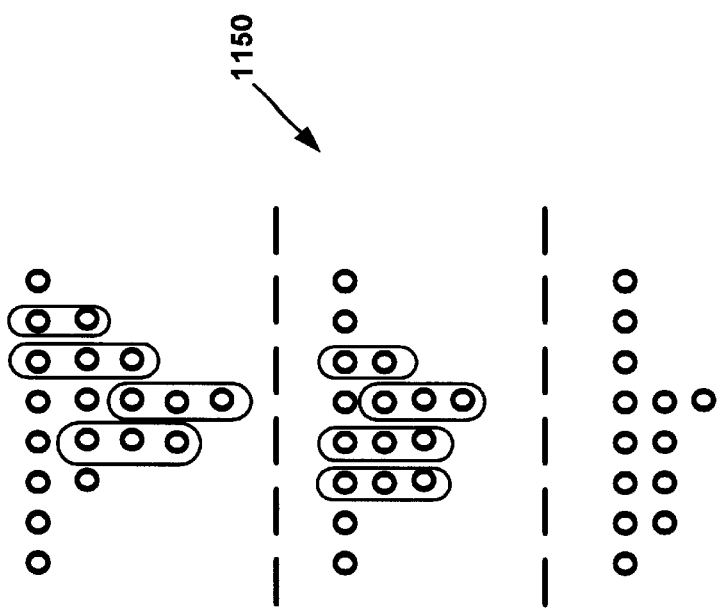
FIG. 11B is a bit representation of a reduction tree for a 4-bit-by-4-bit signed multiplier that has a column with three rows in the final stage and requires a shorter CPA than the multiplier of FIG. 11A in furtherance of an embodiment of the invention.

FIG. 11A illustrates a reduction tree 1110 for a 4-bit-by-4-bit signed mutliplier that does not have a column with three rows in the final stage. As illustrated, only bit-0 can be "squeezed" to 1 node. FIG. 11B illustrates a reduction tree 1150 for the 4-bit-by-4-bit signed multiplier that has a column with three nodes in the final (output) stage. As shown, columns 0, 1 and 2 are "squeezed" to a single node, thus reducing the width of the CPA.

According to another embodiment of the present invention, the run-time of the process of constructing a reduction tree can be improved under certain conditions. Particularly, when the maximum number of nodes per bit (column) of an input matrix is $\delta_L+1$ (e.g., K=3, 4, 5, 7, 10, 14, etc.), then the minimum number of reduction stages needed can be easily determined. According to the present embodiment, when an extra node occurs on the "low edge" the input matrix, then it can be automatically determined that the input matrix can be reduced as if the extra node does not exist. When an extra node occurs on the "high edge" of the input matrix, and if $\delta_L$ is one of the series {4, 13, 19, 28, 94, 211 316, . . . }, then the extra node can also be treated as if it does not exist. In other words, the extra node on the "high edge" can be absorbed when $\delta_{L-1}$ is odd, which is also equivalent to the condition that $\delta_L$ mod $3 \neq 0$.

Figure 9:
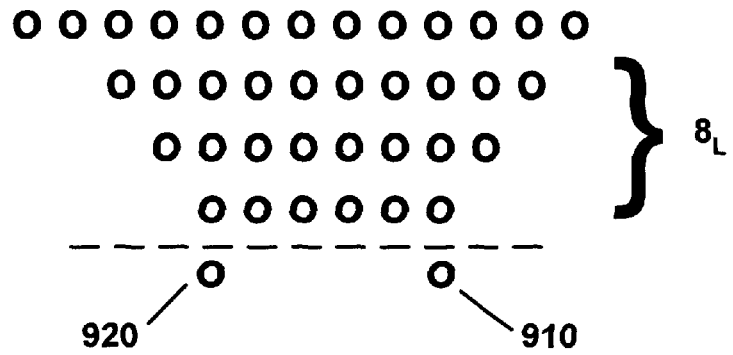
FIG. 9 illustrates an exemplary input matrix that includes an extra "low edge" node and an extra "high edge" node.

FIG. 9 illustrates an exemplary input matrix 900 that includes an extra "low edge" node 910 and an extra "high edge" node 920. When determining the minimum reduction stages required for reducing the input matrix 900, because node 910 occurs on the low edge and because node 920 occurs on the high edge and because $\delta_L$ is 4, both nodes 910 and 920 can be absorbed. Thus; input matrix 900 can be reduced in the same number of reduction stages as if the extra nodes 910 and 920 do not exist. Thus, whenever such extra high-edge nodes and low-edge nodes occur, run-time of tree reduction processes (e.g., process 600) can be significantly improved.

The present invention, fast parallel multipliers implemented using improved tree reduction methods, have thus been disclosed. The techniques and methods disclosed herein enable circuit designers to build reduction trees that have lower delay and consume lower die area than conventional reduction trees. Particularly, the techniques and methods disclosed herein enable the construction of reduction trees that have one fewer reduction stage than conventional reduction trees. Because the length the longest delay path of a reduction tree is mainly determined by the number of reduction stages and the delay of a full adder, the parallel multipliers disclosed herein have a smaller delay and can be operated at a higher speed. Additionally, the reduction tree of one embodiment of the present invention is constructed in such a way that as many bits in final stage have at most one node. In this way, the width of the final adder can be reduced, thus reducing the overall delay of the multiplier.

It should be appreciated that the present invention has been described with specific references. However, it should be appreciated that specific references within the present disclosure should not be construed to limit the scope of the present invention. Rather, the scope of the present invention should be construed according to the below claims.

What is claimed is:

1. A method of constructing a parallel multiplier comprising the steps of:
   a) constructing an input matrix for said parallel multiplier;
   b) determining a depth K of said input matrix;
   c) calculating maximum stage capacity numbers for said input matrix, said maximum stage capacity numbers comprising $\delta_{L-1}$ and $\delta_L$, wherein $\delta_{L-1}$ denotes a maximum stage capacity at a stage (L-1) and $\delta_L$ denotes a maximum stage capacity at a stage L wherein $\delta_{L-1} < K \leq \delta_L$;
   d) determining whether said input matrix is reducible within (L-1) reduction stages; and
   e) provided that said input matrix is reducible within (L-1) reduction stages, constructing a first reduction tree having (L-1) reduction stages for said parallel multiplier.

2. A method as recited in claim 1 further comprising the step of generating a netlist of said parallel multiplier based on said first reduction tree.

3. A method as recited in claim 1 wherein said step (d) comprises the step of attempting to reduce said input matrix to a trial reduction matrix having a depth of $\delta_{L-2}$.

4. A method as recited in claim 1 further comprising the steps of:
   g) provided that said input matrix is not reducible within (L-1) reduction stages, constructing a second reduction tree having L reduction stages; and
   h) generating a netlist of said parallel multiplier based on said second reduction tree.

5. A method as recited in claim 1 wherein said step (d) comprises the steps of:
   determining whether said depth K of said input matrix is equivalent to $\delta_{L-1}+1$;
   determining whether an extra node occurs on a low edge of said input matrix; and
   determining whether an extra node occurs on a high edge of said input matrix.

6. A method as recited in claim 1 wherein an output array of said first reduction tree includes a plurality of least significant bits each having a single node.

7. A method as recited in claim 6 wherein a bit of said output array adjacent to said plurality of least significant bits comprises at most three nodes.

8. A method as recited in claim 1 wherein said step (b) comprises a step of counting a maximum number of nodes per column of said input array.

9. A computer-readable medium having contained therein computer-readable codes for causing a computer-implemented logic synthesis system to perform a method of constructing a parallel multiplier, the method comprising the steps of:
   a) constructing an input matrix for said parallel multiplier;
   b) determining a depth K of said input matrix;
   c) calculating maximum stage capacity numbers for said input matrix, said maximum stage capacity numbers comprising $\delta_{L-1}$ and $\delta_L$, wherein $\delta_{L-1}$ denotes a maximum stage capacity at a stage (L-1) and $\delta_L$ denotes a maximum stage capacity at a stage L and further wherein $\delta_{L-1} < K \leq \delta_L$;
   d) determining whether said input matrix is reducible within (L-1) reduction stages; and e) provided that said input matrix is reducible within (L-1) reduction stages, generating a netlist of a first reduction tree having (L-1) reduction stages for said parallel multiplier.

10. A computer-readable medium as recited in claim 9 wherein said method further comprises the step of generating a netlist of said parallel multiplier based on said first reduction tree.

11. A computer-readable medium as recited in claim 9 wherein said step (d) of said method comprises the step of attempting to reduce said input matrix to a trial reduction matrix having a depth of $\delta_{L-2}$.

12. A computer-readable medium as recited in claim 9 wherein said method further comprises the steps of:

g) provided that said input matrix is not reducible within (L-1) reduction stages, generating a netlist of a second reduction tree having L reduction stages; and h) generating a netlist of said parallel multiplier based on said second reduction tree.

13. A computer-readable medium as recited in claim 9 wherein said step (d) of said method comprises the steps of:

determining whether said depth K of said input matrix is equivalent to $\delta_{L-1}+1$;

determining whether an extra node occurs on a low edge of said input matrix; and determining whether an extra node occurs on a high edge of said input matrix.

14. A computer-readable medium as recited in claim 9 wherein an output array of said first reduction tree includes a plurality of least significant bits each having a single node.

15. A computer-readable medium as recited in claim 14 wherein a bit of said output array adjacent to said plurality of least significant bits comprises at most three nodes.

16. A computer-readable medium as recited in claim 9 wherein said step (b) of said method comprises a step of counting a maximum number of nodes per column of said input array.

17. A parallel multiplier comprising:

a first input for receiving a first operand and a second input for receiving a second operand;

a partial product generator for generating an input array of partial products, wherein said input array has a depth of K nodes;

a reduction tree structure for reducing said input array, said reduction tree structure having (L-1) reduction stages, wherein said depth K of said input array is larger than a predefined maximum stage capacity $\delta_{L-1}$; and a carry propagation adder for summing an output array generated by said reduction tree structure to generate a final product.

18. A parallel multiplier as recited in claim 17 wherein said reduction tree structure comprises a plurality of full adders and a plurality of half adders.

19. A parallel multiplier as recited in claim 17 wherein said output array includes a plurality of bits that are directly mapped to said final product.

20. A parallel multiplier as recited in claim 17 wherein a carry input of said carry propagation adder receives a bit of said output array.

21. A parallel multiplier as recited in claim 17 wherein a final reduction stage of said reduction tree structure includes a plurality of least significant bits each having a single node.

22. A parallel multiplier as recited in claim 21 wherein a bit of said final reduction stage of said reduction tree structure comprises at most three nodes.

* * * * *